No. 841,063. PATENTED JAN. 8, 1907.
J. F. SPRINGER.
BALL BEARING.
APPLICATION FILED MAY 22, 1905.
2 SHEETS—SHEET 2.
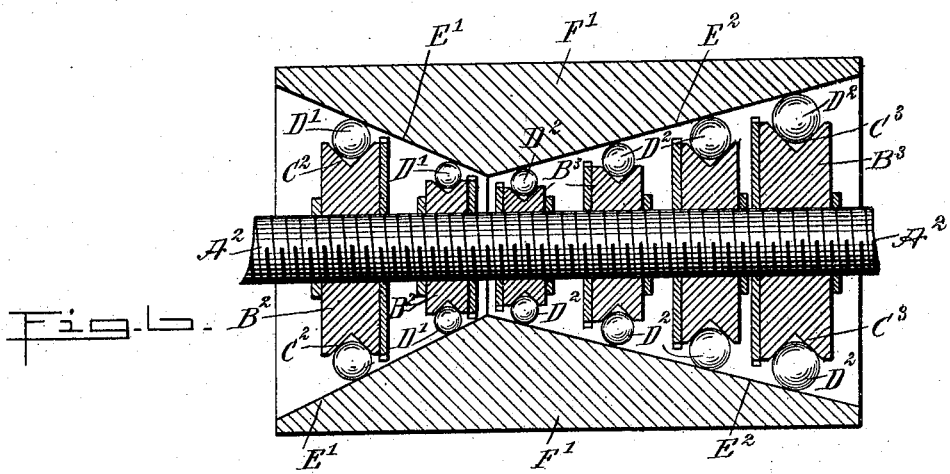
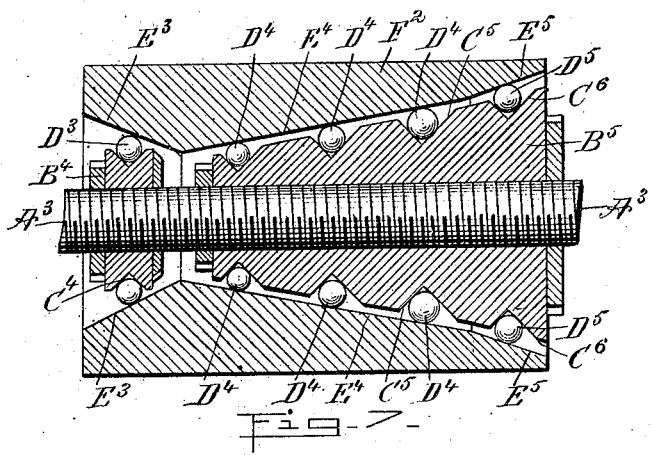
WITNESSES:
INVENTOR
John Franklin Springer
BY
ATTORNEYS

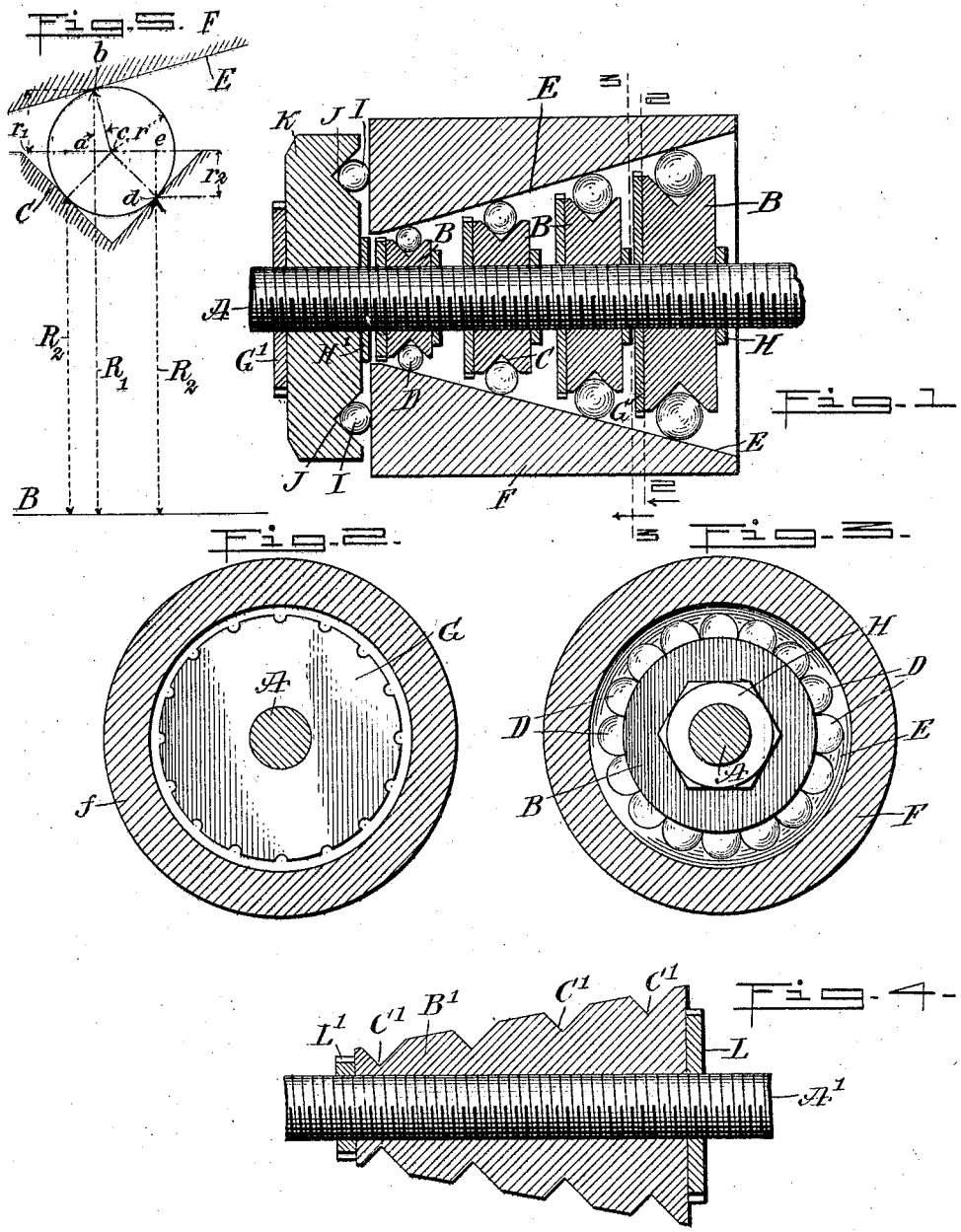

UNITED STATES PATENT OFFICE.

JOHN FRANKLIN SPRINGER, OF GIRARD, PENNSYLVANIA.

BALL-BEARING.

No. 841,0((.  Specification of Letters Patent.  Patented Jan. 8, 1907.

Application filed May 22, 1905. Serial No. 261,727.

*To all whom it may concern:*

Be it known that I, JOHN FRANKLIN SPRINGER, a citizen of the United States, and a resident of Girard, in the county of Erie and State of Pennsylvania, have invented a new and Improved Ball-Bearing, of which the following is a full, clear, and exact description.

The object of the invention is to provide a new and improved ball-bearing arranged to insure a true rolling motion of the balls, unaccompanied by sliding between balls and the bearings, to bear heavy strains, and to allow convenient adjustment with a view to taking up wear, and more especially designed for use on journal-bearings and the like, in which the main portion of the strain is approximately perpendicular to the axis of the shaft.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1 is a longitudinal sectional elevation of the improvement. Fig. 2 is a transverse section of the same on the line 2 2 of Fig. 1. Fig. 3 is a like view of the same on the line 3 3 of Fig. 1. Fig. 4 is a longitudinal sectional elevation of a modified form of the shaft-bearing and its ball-races. Fig. 5 is a diagrammatic view of the improvement. Fig. 6 is a longitudinal sectional elevation of the improvement, showing the hub-bearing provided with two abutting conical surfaces and corresponding shaft-bearings; and Fig. 7 is a like view of the same, showing the hub-bearing provided with three abutting conical surfaces and corresponding shaft-bearings.

On the axle or shaft A, as illustrated in Figs. 1, 2, and 3, is arranged a shaft-bearing in the form of a plurality of members B, having annular ball-races C, made V-shaped in cross-section and containing sets of balls D in frictional engagement with the conical inner surface E of a hub-bearing F. The members B of the shaft-bearing screw on the threaded portion of the shaft A and can thus be adjusted relative to each other, and the members after proper adjustment is made are held in position by nuts G and H, screwing on the threaded portion of the shaft A and engaging opposite faces of each member B. The nut G is preferably in the form of a disk projecting beyond the members B and having notches at its periphery for conveniently turning the nut to screw the same on the threaded portion of the shaft A. The end of the hub-bearing F having the smaller opening is engaged by a set of balls I, arranged in a ball-race J, formed in the face of a member K, screwing on the threaded portion of the shaft or axle A and held in place between nuts H' and G', screwing on the said threaded portion. By the arrangement described an end-thrust bearing is provided for the hub-bearing F.

If desired, the shaft-bearing may be in the form of a single member B', as illustrated in Fig. 4, and provided in its peripheral face with the several annular ball-races C' for the sets of balls D to run in, the member B' screwing on the threaded portion of the shaft or axle A and held in position thereon, after proper adjustment is made, by nuts L and L'.

By reference to Fig. 1 it will be seen that the inner surface E of the hub-bearing is conical, and the ball-races C increase in diameter from the end of the hub-bearing having the smaller opening toward the other end thereof, and the sizes of the balls in the different sets increase as one goes in the same direction. For any set the sizes of the circles of contact, both those traced on the balls by the bearings and those traced on the bearings by the balls, are so related as to insure freedom from frictional slide between balls and bearings. In order to produce the desired result, it is necessary in the case of any set of balls to make the radius of contact traced by this set of balls on the surface E of the hub-bearing F have to the radius of the corresponding circumference traced by the hub-bearing F on a ball in the set the same ratio as that which the radius of either circle of contact traced by a ball of the same set on the shaft-bearing has to the radius of either corresponding circumference traced by the shaft-bearing B on a ball D in the same set. In order to explain this more clearly, reference is had to the diagrammatic view shown in Fig. 5, in which $R_1$ denotes the radius of the circumference traced by any one of the balls D on the hub-bearing surface E, and $r_1$ indicates the radius of the corresponding circumference traced by the hub-bearing surface E on the same ball D. $R_2$ denotes the radius of either of the equal circumferences traced by the ball D on the shaft-bearing B, and $r_2$ indicates the radius of either of the equal corresponding circumferences traced by the shaft-bearing B on the corresponding ball D. The radius of the ball is given by $r$. The parts $R_1$, $r_1$, $R_2$, and $r_2$ are so arranged that the following equations are satisfied:

$$\frac{R_1}{r_1} = \frac{R_2}{r_2}$$

$$R_1 = R_2 + r_1 + r_2.$$

The first of the equations guarantees that whether the hub-bearing F rotates with the shaft-bearing B relatively quiescent, or the shaft-bearing B rotates with the hub-bearing F relatively quiescent, or whether both rotate in opposite directions, the effect produced by the bearing-surfaces on the ball is precisely the same—that is, a true rolling motion is produced, unaccompanied by frictional sliding between the balls D and the bearings F and B. The second equation is an evident requirement of the figure. (See Fig. 5.) Assume now, for instance, the inclination of the generatrix of the hub-bearing surface E to the axis of the shaft A to be fifteen degrees and the inclination of either of the sides of any one of the ball-races C, before referred to, to be forty-five degrees. Also assume four sets of balls and the sizes of the balls in the sets to be three-sixteenths of an inch, one-fourth of an inch, five-sixteenths of an inch, and three-eighths of an inch in diameter. In Fig. 5 the angle $a\ b\ c$ is equal to fifteen degrees and the angle $e\ d\ c$ forty-five degrees, and if $r$ is three thirty-seconds of an inch for the smallest ball then $$r_1 = r\cos.15° = r(.9659) = (.0938)(.9659) = .0906$$

$$r_2 = r\cos.45° = r(.7071) = (.0938)(.7071) = .0663$$

Introducing these values in the equations above given, the values of $R_1$ and $R_2$ are readily determined—that is, $R_1$ equals .5854, $R_2$ equals .4285. In a like manner the values of $r_1\ r_2\ R_1\ R_2$ for the other sets of balls can be readily obtained—that is, for the balls of a diameter of one-fourth of an inch it is found that $r_1$ equals .1207, $r_2$ equals .0884, $R_1$ equals .7805, $R_2$ equals .5714. For the balls of a diameter of five-sixteenths of an inch it is found that $r_1$ equals .1509, $r_2$ equals .1105, $R_1$ equals .9756, $R_2$ equals .7142. For the balls of a diameter of three-eighths of an inch it is found that $r_1$ equals .1812, $r_2$ equals .1326, $R_1$ equals 1.1708, $R_2$ equals .8570. If it should be desired to add more ball-races and sets of balls for the same bearing, the calculations may be made in a similar manner.

It is evident that the sizes of the balls, the inclination of the generatrix of the hub-bearing to the axis, and that of either of the twin faces of the corresponding ball-race to the same axis may all be varied, and, further, all may be varied repeatedly in one and the self-same ball-bearing. It will be necessary, however, to have the angle of the former inclination continually smaller than that of the latter and in all cases the two equations must be satisfied.

In the foregoing is shown and described a bearing having single conical surface E, and such bearing without the end-thrust bearing constitutes a bearing element, and two, three, or more such bearing elements may be combined end to end to form compound bearings having the same axis as shown, for instance, in Figs. 6 and 7, such compound bearings requiring no end-thrust bearings. The compound bearing shown in Fig. 6 consists of two bearing elements—that is, the hub-bearing F' is provided with the surfaces E' and E² in the form of frusta of cones having the same axis and abutting at their small or apex ends. The conical surfaces E' and E² are engaged by sets of balls D' and D², respectively held in the ball-races C² C³ of the shaft-bearing members B² and B³, secured on the shaft or axle A². As shown in Fig. 6, two shaft-bearing members B² and their sets of balls D' are employed for the conical surface E', and four shaft-bearing members B³ and their sets of balls D² are used for the conical surface E²; but the said number of shaft-bearing members and their sets of balls may be increased or diminished without deviating from the invention, it being understood that as a minimum a single shaft-bearing member and corresponding set of balls may be employed for each surface E' or E².

In the modified form shown in Fig. 7 three bearing elements are combined—that is, the hub-bearing F² is provided with the conical bearing-surfaces E³, E⁴, and E⁵, engaged by the sets of balls D³, D⁴, and D⁵, of which the set of balls D³ is mounted in a ball-race C⁴ on the shaft-bearing member B⁴, secured to the shaft A³, while the sets of balls D⁴ D⁵ are mounted in ball-races C⁵ C⁶, formed on the shaft-bearing member B⁵, likewise secured on the axle or shaft A³.

It is understood that the ball-races C² or C³ (shown in Fig. 6) may each or both be in a single shaft-bearing member, and likewise the ball-races C⁴, C⁵, and C⁶ may be all in one single shaft-bearing member or all in separate shaft-bearing members, if desired, and as such constructions involve either the one shown in Fig. 1 or Fig. 4 or combinations thereof further illustration and description of the same is not deemed necessary. It is expressly understood, however, that the relation of the hub-bearing surfaces, the sets of balls, and the ball-races, and the shaft-bearing members is the same as above described in reference to Figs. 1 and 5. It is also understood that the various surfaces E', E², or E³ E⁴ E⁵ may vary in inclination of their generatrices to the shaft-axis, and so likewise with the bearing-surfaces of the different races.

For simplifying the description use is made in the foregoing of the terms "hub-bearing" and "shaft-bearing," although I do not limit myself strictly to hubs and shafts, as the invention may be used on devices not having hubs and shafts, but members having the same relation to each other as the hub-bearing and the shaft-bearing shown and described.

It is understood that by the arrangement set forth a true rolling motion of the sets of balls is obtained, and consequently the sliding friction of the balls in their contact with the bearing parts is reduced to a minimum.

Having thus described my invention, I claim as new and desire to secure by Letters Patent—

1. A compound ball-bearing comprising a hub-bearing provided with a plurality of conical bearing-surfaces having the same axis, a shaft-bearing having its axis coinciding with that of the said hub-bearing, the shaft-bearing having annular races, and sets of balls for the said races and in contact with the said conical bearing-surfaces, the diameters of the balls in successive sets of balls belonging to a conical hub-bearing surface increasing in diameter with the increase in the annular lines of contact of the sets of balls with the corresponding hub-bearing surface.

2. A compound ball-bearing comprising a hub-bearing provided with a plurality of conical bearing-surfaces having the same axis, a shaft-bearing having its axis coinciding with that of the said hub-bearing, the shaft-bearing having annular races, and sets of balls for the said races and in contact with the said conical bearing-surfaces, the balls in each set being alike, the diameters of the balls in successive sets of balls belonging to a conical hub-bearing surface increasing in diameter with the increase in the annular lines of contact of the sets of balls with the corresponding conical hub-bearing surface.

3. A ball-bearing comprising a hub-bearing having a conical bearing-surface, a shaft-bearing having its axis coinciding with that of the said hub-bearing, the shaft-bearing having annular races, and sets of balls for the said races and in contact with the said bearing-surface, the balls in each set being alike, and the diameters of the balls in successive sets of balls increasing in diameter with the increase in the annular lines of contact of the sets of balls with the conical hub-bearing surface.

4. A compound ball-bearing comprising a hub-bearing provided with a plurality of conical bearing-surfaces having the same axis, a shaft-bearing having its axis coinciding with that of the said hub-bearing, the shaft-bearing consisting of rings having annular races, and sets of balls for the said races and in contact with the said conical bearing-surfaces, the balls in each set being alike, the diameters of the balls in successive sets of balls belonging to a conical hub-bearing surface increasing in diameter with the increase in the annular lines of contact of the sets of balls with the corresponding conical hub-bearing surface.

5. A ball-bearing comprising a shaft-bearing consisting of a plurality of rings provided with ball-races and adjustable toward and from each other in the direction of the axis of the shaft-bearing, sets of balls, one set for each ball-race, the balls in each set being alike in size and the size of balls in the different sets varying in diameter, and a hub-bearing having an internal conical bearing-surface in contact with the said sets of balls.

6. A compound ball-bearing comprising a hub-bearing provided with a plurality of conical bearing-surfaces having the same axis, a shaft-bearing having its axis coinciding with that of the said hub-bearing, the shaft-bearing consisting of rings having annular races, sets of balls for the said races and in contact with the said conical bearing-surfaces, the balls in each set being alike, the diameters of the balls in successive sets of balls belonging to a conical hub-bearing surface increasing in diameter with the increase in the annular lines of contact of the sets of balls with the corresponding conical hub-bearing surface, and means for adjusting and maintaining adjustment of the rings forming the shaft-bearing.

7. A ball-bearing comprising a plurality of ball-races, sets of balls, one set of balls for each ball-race, the balls in each set being alike in size and the size of balls in the different sets varying in diameter, and a conical bearing-surface engaging the said sets of balls.

8. A ball-bearing comprising a plurality of ball-races of V shape in cross-section and varying in diameter, sets of balls, one set of balls for each ball-race, the balls in each set being alike in size and the size of balls in the different sets varying in diameter, and a conical bearing-surface engaging the said sets of balls.

9. A ball-bearing comprising a shaft-bearing having a plurality of ball-races, sets of balls, one set for each race, the balls in each set being alike in size and the size of balls in the sets varying in diameter, and a hub-bearing having an internal conical bearing-surface in contact with the said sets of balls.

10. A ball-bearing comprising a shaft-bearing formed of a plurality of ball-races of increasing diameter and adjustable toward and from each other in the direction of the axis of the shaft-bearing, sets of balls, one set for each ball-race, the sets of balls increasing in diameter of the balls in proportion to the increase in the diameters of the races, and a hub-bearing having an internal conical bearing-surface in contact with the said sets of balls.

In testimony whereof I have signed my name to this specification in the presence of two subscribing witnesses.

JOHN FRANKLIN SPRINGER.

Witnesses:
L. B. JONES,
L. G. PECK.